United States Patent
Zhang

[11] Patent Number: 6,156,086
[45] Date of Patent: Dec. 5, 2000

[54] DUAL MEDIA VACUUM FILTER BAG

[75] Inventor: Zhiqun Zhang, Woodbury, Minn.

[73] Assignee: 3M Innovative Properties Company, St. Paul, Minn.

[21] Appl. No.: 09/273,521

[22] Filed: Mar. 22, 1999

[51] Int. Cl.[7] .................................................. B01D 46/02
[52] U.S. Cl. ................................. 55/382; 55/381; 55/361; 55/486; 55/522; 55/524; 55/527; 55/DIG. 2; 55/DIG. 39; 428/36.1
[58] Field of Search ............................... 55/382, 486, 487, 55/522, 524, 527, DIG. 2, DIG. 39, 361, 364, 365, 381; 15/347, DIG. 8; 428/36.1

[56] References Cited

U.S. PATENT DOCUMENTS

| | | |
|---|---|---|
| Re. 30,782 | 10/1981 | van Turnhout . |
| 2,792,076 | 5/1957 | Meyerhoefer . |
| 3,973,936 | 8/1976 | Howard et al. . |
| 4,116,648 | 9/1978 | Busch . |
| 4,164,400 | 8/1979 | Wald . |
| 4,215,682 | 8/1980 | Kubik et al. . |
| 4,257,791 | 3/1981 | Wald . |
| 4,375,718 | 3/1983 | Wadsworth et al. . |
| 4,429,001 | 1/1984 | Kolpin et al. . |
| 4,589,894 | 5/1986 | Gin et al. . |
| 4,592,815 | 6/1986 | Nakao . |
| 4,917,942 | 4/1990 | Winters . |
| 5,080,702 | 1/1992 | Bosses . |
| 5,230,800 | 7/1993 | Nelson . |
| 5,244,703 | 9/1993 | Bosses . |
| 5,306,534 | 4/1994 | Bosses . |
| 5,419,953 | 5/1995 | Chapman . |
| 5,437,910 | 8/1995 | Raabe et al. . |
| 5,647,881 | 7/1997 | Zhang et al. . |
| 5,690,711 | 11/1997 | Bosses ................................. 55/DIG. 2 |
| 5,785,725 | 7/1998 | Cusick et al. ............................. 55/486 |
| 6,045,595 | 4/2000 | Freudenberg .............................. 55/486 |

FOREIGN PATENT DOCUMENTS

| | | |
|---|---|---|
| 0 338 479 B1 | 8/1992 | European Pat. Off. ........ B01D 39/18 |
| 3905565A1 | 2/1989 | Germany . |
| WO 93/21812 | 11/1993 | WIPO . |
| WO 95/05501 | 2/1995 | WIPO . |

OTHER PUBLICATIONS

"Superfine Thermoplastic Fibers", Van A. Wente, Industrial and Engineering Chemistry/Naval Research Laboratory, pp. 1342–1346.

"Manufacture of Superfine Organic Fibers", V.A. Wente, E.L. Boone and C.D. Fluharty, Naval Research Laboratory/NRL Report 4364, 19 pages.

*Primary Examiner*—Duane Smith
*Assistant Examiner*—Minh-Chau T. Pham
*Attorney, Agent, or Firm*—Gary L. Griswold; Robert W. Sprague; William J. Bond

[57] ABSTRACT

There is provided a vacuum cleaner filer bag including at least two sidewalls which sidewalls are joined by seams. At least one first sidewall comprises a film laminate of a heat sealable film layer and a film support layer. At least one second sidewall comprises a filter laminate comprising at least a synthetic fiber filter layer and synthetic fiber support layer where the at least one first sidewall is joined to adjacent sidewalls by thermal seams. The filter layer is preferably a high efficiency microfiber filter media which provides HEPA level performance for the vacuum cleaner bag.

26 Claims, 1 Drawing Sheet

DUAL MEDIA VACUUM FILTER BAG

BACKGROUND AND FIELD OF THE INVENTION

The present invention relates to vacuum cleaner bags, particularly vacuum cleaner bags having filtration layers.

Traditionally, vacuum cleaner bags were constructed with cellulosic paper, generally relatively high basis weight paper. These paper bags are advantageous in terms of their cost. However, relatively recently it has become clear that these bags discharge a significant amount of respirable particulate materials, specifically particles having a diameter of less than 10 microns. These size particles remain airborne for long periods of time and contain many allergens. As such these fine respirable particles are placed into the indoor atmosphere by the vacuum cleaner causing significant health concerns for people with allergies and the like. To address these concerns a number of patents suggest laminating cellulosic bags with inner filtration layers, specifically fine particle synthetic fiber filter material layers, such as meltblown nonwovens, spunbond webs or combinations thereof. For example, U.S. Pat. No. 3,498,031 proposes adding a small felt-like layer onto an inner surface of a paper bag, allegedly this felt-like material intercepts dust circulating within the bag. In order to avoid undue increases in pressure drop, the filter material is only placed at specific locations and certain other areas of the bag are not provided with a filter material. This construction would allow significant amounts of particles to still bypass the filter felt. It also has been proposed to modify traditional paper vacuum cleaner bags by providing a continuous inner liner of a synthetic fibrous filter medium. For example, U.S. Pat. No. 5,080,702 proposes lining a paper bag with a synthetic fibrous filter medium such as a meltblown web and in U.S. Pat. No. 5,306,534 it is suggested that this type of synthetic filter medium bag liner can be electret charged. A similar filter lined paper bag structure is also proposed in European Pat. No. 338479 which describes a filter layer formed of a meltblown nonwoven material or microglass fiber material, which filter material may contain an electret charge. A method for making a filter lined paper bag of the above type is disclosed in U.S. Pat. No. 5,437,910. This patent states that it is important to have paper layer to paper layer overlap at the seams to ensure a sufficiently strong seam. This is accomplished by offsetting the filter liner at one edge of the paper outer layer.

In an attempt to move away from paper altogether, some patents have proposed vacuum cleaner bags formed exclusively of synthetic materials. However, generally the seams for these bags are still described as made by sewing or adhesive bonding as are conventional paper bags. U.S. Pat. No. 4,589,894 proposes a filter layer that comprises a web of random synthetic polymeric microfibers, less than 10 microns in diameter on average. This filter layer web has a specific range of basis weights and air permeability. Further, in order to protect this relatively fragile filter layer, the filter layer is sandwiched between two more resilient outer nonwoven layers, for example, spun bond nonwoven webs. U.S. Pat. No. 4,917,942 also suggests forming a vacuum cleaner bag with synthetic materials. The vacuum cleaner bags produced from this media are allegedly producable on conventional paper bag converting equipment. The filter material laminate comprises a microfiber web of synthetic polymers which web has been directly adhered to a support web. The microfiber web is charged to induce electrets, which provides a filter media having high capture efficiency for fine submicron particles with a relatively low pressure drop.

U.S. Pat. Nos. 5,306,534 and 5,244,703 (Bosses) describes a charged synthetic fiber filter web which is attached permanently by adhesives to a textile fabric to form a reusable vacuum cleaner bag allegedly with high filter efficiency. The electret charged filter web material is a charged melt blown microfiber web (like the '942 patent) placed between two outer support layers (like the '894 patent), specifically described as spunbond materials. The charged meltblown microfiber filter web layer(s) and spunbond layer(s) are described as pattern bonded together.

PCT Publication WO 93/21812 (Van Rossen) describes a vacuum cleaner bag produced with materials such as described in U.S. Pat. No. 4,917,942, which is provided with a scrim layer on the face opposite the vacuum cleaner hose inlet to provide specific abrasion resistance against large sand particles and the like. The scrim layer is bonded to the filter layer only at the vacuum cleaner bag end seams simplifying manufacturing. The seams are stated as formed by welding.

U.S. Pat. No. 5,647,881 proposes a high efficiency vacuum cleaner bag comprising an inner diffusion layer which overlays a synthetic fiber filtration layer and an underlying nonwoven support layer. The inner diffusion layer is purposely not bonded to the underlying filter layer and supporting layer. The resulting bag provides both high efficiency and reduction in particle emissions under shock loading conditions. The seams of the bag can be formed by heat, ultrasonics or adhesives.

Although the above all synthetic material filter bag type constructions provide significant increases in efficiency over traditional paper bags, or even filter layer lined paper bags, there is still a desire for high levels of filtration performance coupled with good mechanical performance at lower costs.

BRIEF SUMMARY OF THE INVENTION

A vacuum cleaner filter bag comprising at least two sidewalls which sidewalls are joined by seams. At least one first sidewall comprises a film laminate of a heat sealable film layer and a film support layer. At least one second sidewall comprises a filter laminate comprising at least a synthetic fiber filter layer and synthetic fiber support layer where the at least one first sidewall is joined to adjacent sidewalls by thermal seams.

DESCRIPTION OF THE PREFERRED EMBODIMENTS

Figure 1:
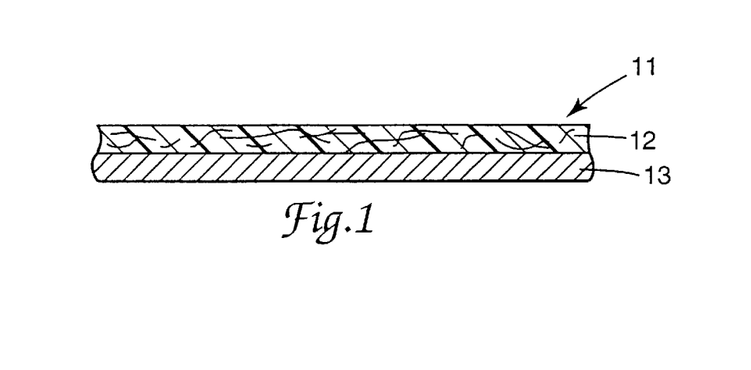
FIG. 1 is a cut away cross-sectional view of the supported film material used to form the invention vacuum cleaner bag.

FIG. 1 represents a cross-section of the composite film material laminate 11 used to form at least one panel or sidewall of the vacuum cleaner bag of the invention. Layer 12 is a fibrous support layer provided primarily for protection of the film layer 13.

Figure 2:
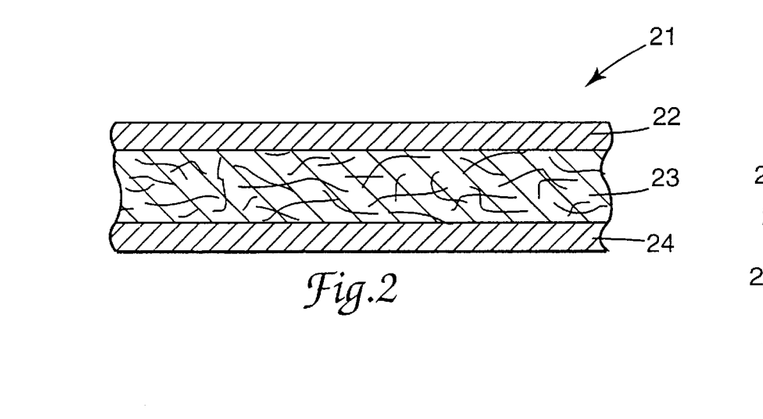
FIG. 2 is a cut away cross-sectional view of the filter material used to form the invention vacuum filter bag.

FIG. 2 represents a cross section of a composite filter material laminate 21 usable to form a second panel or sidewall of the vacuum cleaner bag of the invention. The inner nonwoven filter layer 23 is comprised of a nonwoven web of charged electret containing fibers, which can be any suitable open nonwoven web of charged fibers. The filter web could be formed of the split fibrillated charged fibers described in U.S. Reissue Pat. No. 30,782. These charged fibers can be formed into a nonwoven web by conventional means and optionally joined to a supporting scrim such as disclosed in U.S. Pat. No. 5,230,800, forming the outer support layer 22.

Preferably, the nonwoven filter layer 23 can be a melt blown microfiber nonwoven web, such as disclosed in U.S. Pat. No. 4,917,942. The filter layer can be joined to at least one support layer during web formation as disclosed in that patent, or subsequently joined to a support web or layer in any conventional manner. The melt blown nonwoven web is charged after it is formed, however, it has been proposed to charge the microfibers while they are being formed and prior to the melt blown microfibers being collected as a web. The melt blown nonwoven webs are typically formed by the process taught in Wente, Van A., "Superfine Thermoplastic Fibers" in *Industrial Engineering Chemistry,* volume 48, pages 1342 et seq., (1956), or Report No. 4364 of the Naval Research Laboratories, published May 25, 1954, entitled "Manufacture of Superfine Organic Fibers" by Wente, Van A., Boone, C. D. and Feluharty, E. L., which fibers are collected in a random fashion, such as on a perforated screen cylinder or directly onto a support web or in the manner described in PCT Application No. WO 95/05232 (between two corotating drum collectors rotating at different speeds creating a flat surface and a undulating surface).

The fibers forming the nonwoven filter medium layer 23 are generally formed of dielectric polymers capable of being charged to create electret properties. Generally polyolefins, polycarbonates, polyamides, polyesters and the like are suitable, preferred are polypropylenes, poly(4-methylpentenes) or polycarbonates, which polymers are free of additives that tend to discharge electret properties. Generally, the filter layer should have a permeability of at least about 2 $m^3/min/m^2$, preferably at least 10 $m^3/min/m^2$ up to about 400 $m^3/min/m^2$. The basis weight of the filter layer 23 is generally 10 to 200 $g/m^2$. If higher filtration efficiency is required, two or more filter layers may be used. For high efficiency filter webs the filter layer has a basis weight of less than 100 grams/$m^2$, preferably from about 15 to 60 grams/$m^2$ and a pressure drop of less than 10 mm $H_2O$, preferably less than 6mm $H_2O$, most preferably less than 5mm $H_2O$, at a face velocity of 5.3 cm/sec.

The nonwoven filter layer 23 can also include additive particles or fibers which can be incorporated in known manners such as disclosed in U.S. Pat. Nos. 3,971,373 or 4,429,001. For example, if odor removal is desired, sorbent particulates and fibers could be included in the nonwoven filter layer web.

The fibers forming a high efficiency nonwoven filter layer preferably contains performance-enhancing additives which can enhance the filtration performance of the electret filter layer to HEPA level performance. Potential performance-enhancing additives include those described by Jones et al., U.S. Pat. No. 5,472,481 and Rousseau et al., WO 97/07272 (U.S. Appln. Ser. No. 08/514,866), the substance of which are incorporated herein by reference in their entirety. The performance-enhancing additives include fluorochemical additives namely a thermally stable organic compound or oligomer containing at least one perfluorinated moiety, such as fluorochemical piperazines, stearate esters of perfluoroalcohols, and/or thermally stable organic triazine compounds or oligomers containing at least one nitrogen atom in addition to those of the triazine group. In view of their demonstrated efficacy in improving electret properties, the performance-enhancing additive is preferably a fluorochemical oxazolidinone. Preferably the fluorochemical has a melting point above the melting point of the polymer and below the extrusion temperature. For processing considerations, when using polypropylene, the fluorochemicals preferably have a melting point above 160° C. and more preferably a melting point of 160° C. to 290° C. Preferred fluorochemical additives include Additives A, B and C of U.S. Pat. No. 5,411,576 having the respective structures, and Preferred triazines include those having the following generic structure, where $R^2$ is an alkyl group, which may be straight chain or branched and preferably having 4 to 10 carbon atoms and n is a number from 2 to 40, preferably 2 to 20.

The polymer and performance-enhancing additive can be blended as solids before melting them, or melted separately and blended together as liquids. Alternatively, the additive and a portion of the polymer can be mixed as solids and melted to form a relatively additive-rich molten blend that is subsequently combined with the non-additive-containing polymer.

The performance enhancing additive is preferably a hindered or aromatic amine compound; most preferably a compound containing a hindered amine such as those derived from tetramethylpiperidine rings, where R is hydrogen or an alkyl group. Preferably the hindered amine is associated with a triazine group as described above. Alternatively, nitrogen or metal containing hindered phenol charge enhancers could be used such as disclosed in U.S. Pat. No. 5,057,710, the substance of which is incorporated by reference in its entirety. The filter medium preferably contains about 0.2 to 10 weight percent of the performance-enhancing additive; more preferably about 0.2 to 5.0 weight percent; and most preferably about 0.5 to 2.0 weight percent, based on the weight of the filter medium.

The melt-blowing process used to produce high efficiency to HEPA level performing filter layers, is modified to produce fine fiber filter webs having effective fiber diameters (EFD's), of less than 5 microns, preferably less than 4.5 microns, and most preferably less than 4 microns. The effective fiber diameter can be decreased by decreasing the collector to die distance, using a vacuum within a foraminous collector surface, lowering the polymer flow rate, or changing the air pressure, temperature or volume used to attenuate the melt streams exiting from the die. Also, the design of the die and attenuating air vanes can be varied such as changing the relative angle of the attenuating air, changing the distance between the die tip and the junction point of the attenuating air or changing the die orifice diameters and/or diameter-to-length ratios. These factors and others are discussed for example in WO 92/18677A (Bodaghi et al.). A preferred intermediate composition for making the invention electret filter web is made by blending and extruding a mixture of 90 to 99.8 weight percent organic polymer and 0.2 to 10 weight percent of a performance-enhancing additive; wherein the material is extruded through a die under meltblown conditions to form fibers that are collected as a nonwoven web. The fibers can be quenched, before being collected, by a cooling process such as water spraying, spraying with a volatile liquid, or contacting with chilled air or cryogenic gasses such as carbon dioxide or nitrogen.

Melt-blown fibers are collected as a nonwoven web on a rotating drum or moving belt. The collector to die distance is generally from 8 to 25 cm, preferably from 10 to 20 cm with the collector preferably being foraminous such that it can be used with a vacuum to remove excess air.

The filter web is generally electrostatically charged before or after the filter web has been collected. Examples of electrostatic charging methods useful in the invention include those described in U.S. Pat. No. 5,401,446 (Tsai, et al.), U.S. Pat. No. 4,375,718 (Wadsworth et al.), U.S. Pat. No. 4,588,537 (Klaase et al.), and U.S. Pat. No. 4,592,815 (Nakao). The electret materials may also be hydrocharged (see U.S. Pat. No. 5,496,507 to Angadjivand et al.). Preferably, the charging process involves subjecting the nonwoven web to hydrocharging as disclosed in U.S. Pat. No. 5,496,507. This charging method is advantageous in that it easily provides the required charging level to form a HEPA filter web in a process that can be continuous. Also this charging method can be performed on a preformed web thereby avoiding the difficulties in forming charged fibers into a uniform web structure.

The fibers can be a single homogenous layer, or blend, or multiple layers such as a sheath-core configuration. If multiple layers are employed at least some of the outer layers or the sheath layer must contain the performance-enhancing additive as described in the blends discussed above. The other layer can be heat sealable to the adjacent film or nonwoven support layers. Preferably, as discussed above, the extruded fibers are in the form of microfibers having an effective diameter of less than 5 micrometers, as calculated according to the method set forth in Davies, C. N., "The Separation of Airborne Dust and Particulates," Inst. of Mech. Eng., London, Proceedings 1B, 1952.

HEPA electret charged filters formed, for example, by hydrocharging as described above are generally characterized by having a charge level as measured by TSDC of at least 5 $\mu C/m^2$, preferably at least 6 $\mu C/m^2$. In TSDC a sample is placed between two electrodes, heated at a constant rate, and current discharged from the sample is measured by an ammeter. TSDC is described, for example, U.S. Pat. No. 5,256,176, Lavergne et al., "A Review of Thermo-Stimulated Current," IEEE Electrical Insulation Magazine, vol. 9, no. 2, 5–21, 1993, and Chen et al., "Analysis of Thermally Stimulated Processes," Pergamon Press, 1981.

Charged articles can be tested directly. Alternatively, charged and uncharged articles can be first poled in an electric field at an elevated temperature and then rapidly cooled below the glass transition temperature ($T_g$) of the polymer with the polarizing field on to "freeze in" the induced polarization. The sample is then heated at a constant rate and the resulting discharged current in measured.

A preferred high efficiency filtration medium of the invention preferably comprises a filter web of electret charged fibers of polypropylene, poly(4-methyl-1-pentene) or blends thereof which have a basis weight (BW) of less than 100 grams/m², an effective fiber diameter (EFD) of less than 5 microns and a penetration (PEN) of less than 0.03%, wherein the ratio (I);

$$BW/(EFD \cdot PEN) \qquad I$$

is greater than 100, preferably greater than 200, most preferably greater than 1,000. The high efficiency filter web percent penetration (PEN) is preferably less than 0.02%, and most preferably less than 0.01%. Percent penetration is defined as particle concentration downstream versus particle concentration upstream for 0.3 micron DOP particles at a face velocity of 5.3 cm/sec.

Figure 3:
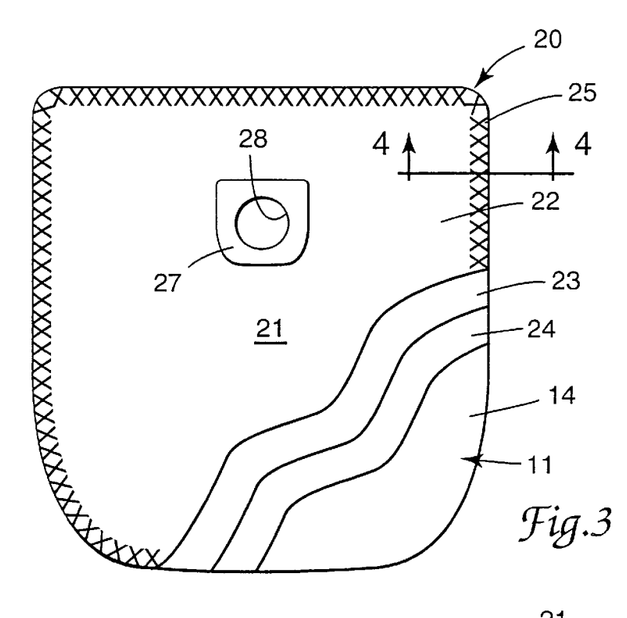
FIG. 3 is a top elevational view of the invention vacuum cleaner filter bag with a partial cut away.

The filter material laminate forming the vacuum cleaner bag sidewalls is preferably further provided with at least one inner diffusion layer 24, which is preferably substantially unbonded to the filter layer 13 except at the periphery of the vacuum filter bag 20 along a seam 25. Two or more inner diffusional layers can be provided to provide improved loading capacity for the vacuum cleaner bag.

Both the outer support layer 22 and the inner diffusion layer 24 can be formed of a nonwoven or woven fibrous material. Preferably, for ease of manufacturing, cost, and performance the outer support layer 22 and the inner diffusion layer 24 are nonwoven fibrous web materials formed at least in part from heat-sealable or weldable thermoplastic fibers. Preferably the fibers are heat sealable to the film layer 12 such as being formed at least in part with a compatible heat sealable resin as a fiber or fiber layer, e.g. for bi-component type fibers. Examples of such materials include spunbond webs, spunlace webs and consolidated carded and "Rando" webs. However, the outer support layer need not necessarily be heat-sealable if either or both of the inner diffusion layer 24 and the filter layer 23 are heat sealable. As such, the outer support layer 22 can be a non heat-sealable, porous fibrous material, such as a paper, scrim, cloth or the like. Generally the outer support layer is a consolidated nonwoven web.

Generally, the outer support layer 22 is limited only by the necessity that it has strength sufficient to resist tearing in ordinary use. Further, the outer support layer 22 should generally have an air permeability of at least about 50 m³/min/m², preferably at least 100 m³/min/m² up to about 500 m³/min/m² or more. The basis weight of the outer support layer 22 is generally 10 to 100 g/m².

The outer support layer 22 can be either bonded or non-bonded to the filter layer 23 with the exception of the seam 25 area. However, if the outer support layer is bonded to the filter layer 23, it is done so in a manner that will not significantly decrease the open area of the filter web. Acceptable bonding methods include adhesives, spot ultrasonic welding or heat bonding or the like. Generally, the bonded area should be no more than 20% of the filter cross-sectional area, generally less than 10%.

The diffusion layer 24 should have an air permeability of generally at least about 50 m³/min/m², preferably 100 m³/min/m² but less than 1000 m³/min/m², most preferably from 100 m³/min/m² to 700 m³/min/m². If the permeability is more than about 1000 m³/min/m², the diffusion layer is too open to act as an initial barrier to the high velocity particles entering the bag, which adversely affects the shock loading efficiency of the bag. The diffusion layer 24 generally has a basis weight of from about 10 to 100 g/m², preferably 15 to 40 g/m². The diffusion layer has a tensile strength (as defined in the examples) of at least about 0.10 kg/cm, preferably at least about 0.15 kg/cm. The fibers of the inner diffusion layer should have an effective fiber diameter of at least about 10 $\mu$m. Suitable diffusion layers include spun bond webs of thermoplastic fibers and consolidated carded webs such as point bonded carded webs of polyolefin (e.g., polypropylene) staple fibers.

The film layer 13 is any suitable thermally sealable film layer which is bondable under thermal conditions (i.e., heat welding or ultrasonic bonding) to the support web 12 and either the filter layer 23 and/or the diffusional layer 24 which layers are thermoplastic. Generally, the layers are heat sealable by being formed of compatible thermoplastic materials (e.g., all the layers are formed of the same, or similar, polymers such as polyethylene, polypropylene or copolymers thereof). The film layer is preferably formed of a polypropylene polymer or copolymer or at least has an outer layer of these polymers if it is a multilayer film. Coextruded or otherwise formed multilayer films can be used for example when needed to bond incompatible materials on either side of the film layer. The film layer can have a basis weight from about 30 to 400 g/m², preferably 60 to 200 g/m². With basis weights greater than 200 g/m² the seams can become excessabilty stiff resulting in a bag that does not easily open or flex.

The support layer 12 is generally similar to support layer 22 and is preferably bonded to the film layer 13 only at least the seams. The support layer 12 is also preferably heat sealable to the film layer or the outer face of the film layer. The preferred support layer is a consolidated nonwoven, such as a spunbond nonwoven or heat bonded carded web formed of polypropylene fibers. Air permeability is not important for support layer 12 but it will generally have a basis weight of from 10 to 100 g/m² and be formed of similar material as the support layer 22. The composite of the film layer 13 and support layer 12 form a sidewall or panel of the vacuum cleaner bag generally forming from 20 to 80 percent of the vacuum clear bag surface area, preferably 40 to 60 percent.

Figure 4:
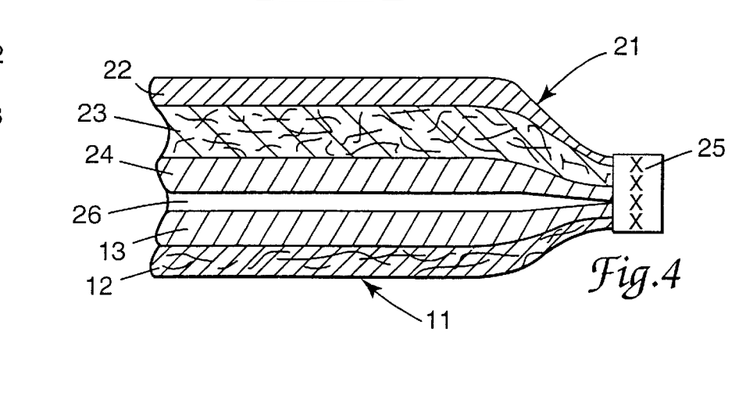
FIG. 4 is a enlarged cross-sectional view of an edge region of the invention vacuum cleaner filter bag.

The invention vacuum cleaner filter bag 20 is formed by joining the composite filter sidewall(s) and composite film sidewall(s) by a thermal bonding method preferably by ultrasonic thermal bonding. The seam 25 joins the two different laminates 11 and 21 forming vacuum bag 20 sidewalls or panels with an inner open area 26 for capture of particulates. Collar 27 provides access into the inner open area 26.

A method for producing the disposable filter bag comprises placing at least the two multilayer laminates 11 and 21, together and welding the at least two layers along a continuous peripheral edge line to form an edge seam 25. Prior to forming the edge seam, an inlet opening is provided in the filter laminate 21 allowing the air to be filtered to enter the filter bag. Furthermore, an air permeable outermost layer of a textile fabric can be laminated to the bag to form a durable bag.

EXAMPLES

Filtration Materials

Material A

Cellulose paper filter material used in commercially available vacuum cleaner bags.

Material B

A commercially available vacuum cleaner bag material laminate consisting of a layer of blown microfibers adjacent to a layer of cellulose paper.

Material C

A vacuum cleaner bag material filter laminate, consisting of a spunbond carrier fabric to which a layer of blown microfibers has been co-extensively adhered, the spunbond/microfiber laminate carrying an electret charge, is joined to a second, spunbond fabric layer adjacent to the electret charged microfiber layer. This second spunbond layer forms an inner diffusional layer. The filter laminate was prepared as described in U.S. Pat. No. 4,917,942 (Winters), the patent being incorporated herein by reference, comprising a spunbond carrier fabric (34 g/m$^2$ basis weight, available from Fiberweb North American Inc., Simpsonville, S.C.), a 40 g/m$^2$ basis weight electret charged blown microfiber web having a 5 μm average diameter. A spunbond cover web (34 g/m$^2$ basis weight, available from Fiberweb North America, Inc.) formed the inner diffusional layer.

Material D

A three layer filter material laminate construction similar to that of Media C except that the blown microfiber layer consisted of a 30 g/m$^2$ basis weight high efficiency particulate air (HEPA) electret charged blown microfibers. The polypropylene based blown microfiber (BMF) web was prepared using a melt blowing process similar to that described, for example, in Wente, "Superfine Thermoplastic Fibers," in *Industrial Engineering Chemistry*, Vol. 48, pages 1342 et seq (1956) or in Report No. 4364 of the Naval Research Laboratories, published May 25, 1954, entitled "Manufacture of Superfine Organic Fibers" by Wente et al. The extruder had four temperature control zones which were maintained at 210° C., 290° C., 340° C., and 340° C., the flow tube connecting the extruder to the die was maintained at 320° C., and the BMF die, available from the J&M company (Dawsonville, Ga.) under the designation J&M MPMB Die (Melted Polymer Melt Blown Die), was maintained at 320° C. The primary air was maintained at about 400° C. and 690 kilopascals (kPa) with a 0.102 cm gap width, to produce a uniform web. Polypropylene resin (Escorene™-PP 3505, a 400 melt flow index polypropylene resin available from Exxon Corp., Houston, Tex.) was delivered from the BMF die at a rate of 0.182 g/hole/min. and the resulting web collected on a spunbond fabric (34 g/m$^2$, available from Fiberweb North America, Inc.) passing around a perforated rotating drum collector positioned 12 cm from the BMF die. The collector drum was connected to a vacuum system, which was maintained at a vacuum of 6.18×10$^3$ pascal. A water mister was positioned intermediate of the BMF die and the collector drum to facilitate cooling the BMF web. The microfibers had an average Effective Fiber Diameter (EFD) of 2.8 μm. A charge enhancement package consisting of CHIMASSORB™ 944FL (a hindered amine available from Ciba-Geigy Corp., Hawthorne, N.Y.) compounded into poly(4-methyl-l-pentene) (TPX DX 820, available from Mitsui Petrochemical Industries, Tokyo, Japan), was added to the polypropylene pellet feed as a powder during preparation of the BMF webs. The stabilization package powder was prepared by melt compounding the CHIMASSORB™ 944FL into the poly(4-methyl-1-pentene) in a single screw extruder in a 40:60 ratio, extruding the resultant blend into a large diameter fiber, and grounding the fiber into a powder (0.125 inch mesh). The composition of the BMF web consisted of 98.3 wt. % polypropylene, 0.9 wt. % poly(4-methyl-1-pentene), and 0.8 wt. % CHIMASSORB™ 944FL. Subsequent to formation, the BMF web was charged using a hydro-charging process substantially as described in U.S. Pat. No. 5,496,507 (Angadjivand et al.) which is incorporated herein by reference, using a water pressure of about 550 kPa.

The particle capture efficiencies of Materials A–C were characterized using the test method described in the SAE standard SAE J1669. PTI fine dust (available from Powder Technology Inc., Burnsville, Minn.) was used as the particulate challenge which was delivered to the test filter material at a constant face velocity of 10 cm/s or 20 cm/s. Material D was characterized using the TSI 8110 Automated Filter Tester, available from TSI Inc, Shoreview, Minn., at 20 cm/s with a DOP aerosol. Test results are indicated in Table 1, below. Particle concentrations upstream and downstream of the test filter materials were measured using a HIAC/ROYCO Model 1230 particle counter (available from Pacific Scientific, HIAC/ROYCO Division, Silver Spring, Md.). Pressure drops across the filter materials were measured using a differential transducer, MKS Type 698 (available from MKS Instrument, Inc., Richardson, Tex.). Particle capture efficiency data for filter Materials A–D are reported in Table 1.

TABLE 1

Filter Material Performance
(0.3 μm Particle Efficiency @10 cm/sec)

| Filter Material | % Penetration | Pressure Drop |
|---|---|---|
| A | 73.3[a] | 13.4[a] |
| B | 32.4[a] | 16.8[a] |
| C | 4.7[a] | 7.2[a] |
| C[a] | 5.7[b] | 14.5[b] |
| D | 0.014[c] | 40.2[c] |

[a]Tested with the SAE J1667 test method at a face velocity of 10 cm/sec.
[b]Tested with the SAE J1667 test method at a face velocity of 20 cm/sec.
[c]Tested with the TSI 8110 DOP test method at a face velocity of 20 cm/sec.

Emission Test

Vacuum filter bags having a rectangular design (45.7 cm×24.5 cm) consistent with the bag design required for a Kenmore Progressive Upright vacuum (available from Sears Robeck Co., Chicago, Ill.) were used to evaluate the filtration performance of filtration Media A–D using a vacuum cleaner particle emission test method, as described below. Commercially available vacuum cleaner bags based on Media A, B, and C served as comparative examples C1, C2, and C3, respectively, for this evaluation. Dual media vacuum cleaner bag constructions of the present invention were prepared using the filter Media C and D as follows:

Example 1

A circular aperture (4.8 cm in diameter was cut into a rectangular piece (45.7 cm×25.4 cm) of Media C, centrally positioned width wise and approximately 33.5 cm from one end of the filter media and a cardboard collar adhesively attached to one of the spunbond layers using a Jet Melt 3748 Q hot melt adhesive (available from 3M Company, St Paul, Minn.). The bag was assembled by preparing a laminate consisting of a rectangular piece of spunbond fabric (45.7 cm×25.4 cm, 34 g/m$^2$, available from Fiberweb North American, Inc.), a rectangular piece of polypropylene film (45.7 cm×25.4 cm, 65 μm thick, available from American Profol Inc., Cedar Rapids, Iowa ) and finally the collar bearing rectangular piece of Media C, positioned with the collar on the outer face of the filter media, and ultrasonically welding the perimeter of the laminate assembly together using a Branson FS 90 Ultrasonic Welding unit (available from Branson Ultrasonic Corp., Danbury, Conn.) operating at 75% of the maximum power setting, $3.4 \times 10^5$ Pascal anvil pressure, and a line speed of 0.1 m/sec.

Example 2

The vacuum filter bag of Example 2 was assembled substantially as the bag for Example 1 except that Media C was replaced by Media D.

The emission tests were performed by installing a residential vacuum cleaner Kenmore Progressive Upright in a test chamber, feeding PTI Fine dust (2 g) into the vacuum, and measuring the particulate emission in the exhaust of the vacuum using a LASAIR Model 1002 particle counter (available from Particle Measurement Systems, Inc, Boulder Colo.). Particle emission data are presented in Table 2.

TABLE 2

| Example | Particle Emission Data (0.1–2 $\mu$m Particles) Particle Emissions (particles/cm$^3$) |
|---|---|
| C1 | 7133 |
| C2 | 3602 |
| C3 | 748 |
| 1 | 822 |
| 2 | 5.6 |

The data in Table 2 clearly demonstrates the effectiveness of the dual media bags of Example 1 and 2 in removing micro-particles. The bags of Examples 1 and 2 were one to two orders of magnitude, respectively, more efficient than conventional cellulose (C1) or hybrid cellulose/meltblown (C2) bag constructions in removing particles. The bag of Example 1 performed substantially comparable to a commercially available electret charged microfiber bag (C3), and both dual media bags used half of the filter media used in the bags of C1-C3.

Bag Loading Capacity Test

An indication of the useful life of a vacuum cleaner bag was provided by its dust holding capacity. In this study, the performance of the dual media bags of the present invention having different basis weight inner diffusion layers was studied. The test subjected the vacuum filter bags to a simulated in-service environment using a commercially available residential vacuum Kenmore Progressive as the test apparatus. The loading test was performed by incrementally loading Portland cement dust in the bag and measuring the air-power of the vacuum cleaner according to test method ASTM F 558-88. Bag constructions are described below and bag loading capacity results, which are reported as the loading after a 50% airpower reduction, are presented in Table 3.

Comparative Example C4

The bag of Comparative Example C4 was assembled substantially the same as the bag of Example 1 except that the inner diffusion layer was eliminated.

Example 3

The bag of Example 3 was assembled substantially the same as the bag of Example 1 except that the spunbond fabric used for the inner diffusion layer filter had a basis weight of 17 g/m$^2$ (available from Fiberweb North American, Inc.) in place of the 34 g/m$^2$ basis weight fabric.

Example 4

The bag of Example 4 was assembled substantially the same as the bag of Example 3 except that two layers of 17 g/m$^2$ basis weight spunbond fabric were used for the inner diffusion layer.

TABLE 3

| Dust Loading Capacity Results | |
|---|---|
| Example | Loading Capacity (g) (After 50% Airpower Reduction) |
| C4 | 50 |
| 1 | 78 |
| 3 | 64 |
| 4 | 93 |

The data in Table 3 demonstrates that vacuum filter bag constructions with an inner diffusion layer have significantly higher dust holding capacity than a bag with no inner diffusion layer. Further, the dust holding capacity of a bag increases with increasing the basis weight of the inner diffusion layer. More importantly, the dust holding capacity can be significantly improved by using multiple diffusion layers. The loading capacity of the bag of Example 4, which utilized two layers of 17 g/m$^2$ basis weight fabric as the diffusion liner, showed a 19.2% higher loading capacity than the bag of Example 1, which had a single layer of 34 g/m$^2$ basis weight spunbond fabric as the diffusion liner.

Film Protection Layer

The film layer of the dual media vacuum filter bags of the present invention were subject to puncture as the film contacted sharp projections within the vacuum bag cavity as the bags experienced repeated inflation/deflation cycles. The effect of the film thickness and the addition of a protective outer spunbond fabric layer were studied in the following examples. The various bag constructions were subjected to a modified loading test wherein the bags were placed in a Kenmore Progressive Upright vacuum cleaner and continuously loaded with 2,000 g of Portland cement dust. After loading the cement dust, the vacuum was operated continued for an additional 30 minutes, the filter bag removed and inspected for damage. Bag constructions are described below and the effect of the film thickness or protective outer layer presented in Table 3.

Comparative Example C5

The bag of Comparative Example C5 was substantially the same as the bag of Example 1 except that the outer protective spunbond fabric layer was eliminated. Comparative Example C6

The bag of Comparative Example C6 was substantially the same as the bag of Comparative Example C5 except that the 65 $\mu$m thick polypropylene film was replaced with a 95 $\mu$m thick polypropylene film.

TABLE 4

Dual Media Bag Puncture Resistance

| Example | Puncture Resistance |
|---------|---------------------|
| C5 | Punctures |
| C6 | Punctures |
| 1 | No Punctures |
| 3 | No Punctures |

The durability test results reported in Table 4 clearly show the advantage of an outer protective layer of spunbond fabric.

The effect of a laminated spunbond/film laminate construction as compared to a co-extensive, loose spunbond/film laminate was studied using a modified bag loading test. In this test, the bags in a Kenmore Progressive Upright vacuum were loaded with 1000 g of Portland cement dust and then pulsed by opening and closing the vacuum inlet hose at two second intervals for 1,000 cycles. Bag constructions are described below and the performance of the film/spunbond construction presented in Table 3.

Comparative Example C7

The bag of Comparative Example C7 was substantially the same as the bag of Example 1 except that the loose film/spunbond construction was replaced with co-extensively laminated spunbond/film construction. The film/spunbond laminate was prepared by spray applying #90 High Strength Adhesive (available from 3M Company, St. Paul, Minn.) to the polypropylene film, placing the spunbond fabric over the adhesive coated film and rolling the laminate with a 10 kg roller to adhere the spunbond fabric to the film.

TABLE 5

Alternative Protective Layer Constructions

| Example | Film Appearance |
|---------|-----------------|
| C7 | Deep crease in film |
| 1 | Minor crease in film |

As illustrated in Table 5, a loose outer layer provided better protection to the film.

Permeable Media Area/Performance Correlation

The effect of the area of the permeable media on the performance of the dual media bags of the present invention was studied by following particle emissions (test procedure described above), air flow, and air power reduction (test procedure described above) as a function of the permeable area of the bag. The bag configuration used for this study was substantially that of Example 1, with the exception that the permeable media area was systematically increased from 20% to 80% of the total area of the bag. All tests were conducted using a Kenmore Progressive Upright vacuum.

TABLE 6

Particle Emissions/Permeable Area Correlation

| % Permeable Area | Particle Emissions (particles/cm$^3$) |
|------------------|---------------------------------------|
| 20 | 6.5 |
| 30 | 6.2 |
| 40 | 6.2 |
| 50 | 3.4 |
| 60 | 1.7 |
| 70 | 1.8 |
| 80 | 2.8 |

Particle Emissions test results shown in Table 6 show a decrease in emissions with increasing permeable area, however, the influence of permeable area became less significant when the permeable area was greater than 50%.

The effect of the area of permeable media on air flow through the bag was tested as follows:

A Kenmore Progressive Upright vacuum equipped with the test bag was placed in a test chamber described by the proposed ASTM F 11. 23: Standard test method for determining initial, fractional filtration efficiency of a vacuum cleaner system. The suction hose of the vacuum cleaner was connected to the air inlet of the chamber, the vacuum turned on and the airflow through the test chamber (and bag) measured.

TABLE 7

Air Flow/Permeable Area Correlation

| % Permeable Area | Mean Air Flow (m$^3$/hr) |
|------------------|--------------------------|
| 20 | 104 |
| 30 | 116 |
| 40 | 119 |
| 50 | 121 |
| 60 | 121 |
| 70 | 120 |
| 80 | 122 |

Examination of the data in Table 7 shows that with permeable areas greater than 40% initial air flow was not significantly increased by increasing the permeable area. However, a noticeable drop in the airflow occurred when the permeable area was less than 40%.

The effect of the permeable media area on the loading capacity of the dual media bags of the present invention was studied using the above described Bag Loading Capacity Test, the results of which are reported in Table 8.

TABLE 8

Bag Loading Capacity/Permeable Area Correlation (% Power Retained at Indicated Loading)

| Load (g) | % Permeable Area | | | | | | |
|----------|-----|-----|-----|-----|-----|-----|-----|
|          | 80% | 70% | 60% | 50% | 40% | 30% | 20% |
| 0   | 100  | 98.2 | 94.1 | 94.1 | 92.7 | 88.6 | 72.3 |
| 20  | 96.8 | 92.7 | 85.0 | 78.6 | 64.1 | 45.5 | 15.0 |
| 40  | 90.9 | 82.7 | 72.3 | 65.0 | 46.4 | 23.6 | 7.3 |
| 60  | 82.3 | 70.0 | 60.0 | 52.7 | 36.8 | 14.5 | 5.0 |
| 80  | 70.9 | 58.2 | 49.1 | 41.8 | 27.7 | 10.0 | 2.7 |
| 100 | 61.4 | 47.3 | 40.5 | 35.5 | 20.5 | 8.2  | 2.3 |

The data presented in Table 7 shows that, in general, the air power reduction rate with decreasing area of the permeable media used in a bag. Further, reduction of the air power of a vacuum cleaner became more pronounced when the permeable area was below 40%.

Bag Strength

A relative measure of the strength of the dual media bags of the present invention was obtained by measuring the burst pressure drop of the bag. Replicate samples of the bag construction of Example 1 were placed in a 3½ HP Shop Vac vacuum cleaner (available from Shop Vac Corp, Williamport, Pa.) and Portland cement dust was fed into the vacuum cleaner until the bag burst. The burst pressure drop at which the bag burst, was measured using a differential pressure gauge, Cole Parmer 68370-04 (available from Cole-Parmer Instrument Co., Vernon Hills, Ill.). The average burst pressure drop for the five bags was 74.0 inches $H_2O$ which is significantly higher than the maximum vacuum (typically 50 inches $H_2O$) most commercially available vacuums are capable of delivering.

Maximum Weld Thickness

A series of examples were run to determine the maximum film thickness that could be ultrasonically welded to a microfiber filtration media typical of that used in the construction of the dual media bags of the present invention. Film thickness was varied by using multiple layers of the 65 μm thick (60 g/m² basis weight) polypropylene film in a dual media bag construction similar to that described in Example 1. Ultrasonic welding was accomplished using a Branson FS 90 Ultrasonic Welder operating at 75% of the maximum power setting, $3.4 \times 10^5$ Pascal anvil pressure, and a line speed of 0.1 m/sec. A subjective assessment of the bond strength and damage to the microfiber layer as a function of the number of film layers is reported in Table 9.

TABLE 9

Film Thickness/Weldability

| # Layers | Thickness (μm) | Basis Weight (g/m²) | Results |
|---|---|---|---|
| 1 | 65 | 60 | Good weld |
| 2 | 130 | 120 | Good weld |
| 3 | 195 | 180 | Good weld |
| 4 | 260 | 240 | Good weld |
| 5 | 325 | 300 | Good weld |
| 6 | 390 | 360 | Welded |
| 7 | 455 | 420 | Difficult to weld |
| 8 | 520 | 480 | Poor weld, microfiber damage |

The data shown in Table 9 clearly indicates that the maximum weldable film thickness, with no damage to the microfiber layer, was 7 layers (455 μm; 420 g/m²). More layers could be welded, but severe deterioration of the BMF layer occurred due to the higher temperature generated. The bag made with one film layer actually had the highest seam strength, and multi-film layers did not improve the seam strength.

Flexibility Test

Bags having 1–5 layers of film which were prepared in the above described "weldability" experiments were placed in a Kenmore Progressive Upright vacuum and the expansion of the bags observed during vacuum operation. Bags having one or two film layers were fully expanded during operation, the bag having three film layers was partially expanded, and the bags having four or five film layers were, at best, only marginally expanded. This data suggests that film thickness must be carefully controlled to achieve the desired bag performance.

Bond Strength/Bonding Process/Film Studies

A series of experiments were conducted in which the bond strength between spunbond/microfiber laminates and various films were studied as a function of the type of process used to achieve the bond.

Materials

Filter Media C
  A spunbond/polypropylene microfiber/spunbond laminate described above
Polypropylene film
  65 μm thick, 60 g/m² basis weight, available from American Profol
Poly(ethylene terephthalate) (PET) Film
  90 μm thick, 100 g/m² basis weight, available from Teijin Limited, Tokoyo, Japan
Nylon Film
  60 μm thick, 58 g/m² basis weight, available from KNF Corp., Tamaqua, Pa.

Welding Processes

Ultrasonic Welding
  Branson FS 90 Ultrasonic Welder operated at 75% of the maximum power setting, $3.4 \times 10^5$ Pascal anvil pressure and a line speed of 0.1 meters per minute
Thermal Welding
  Heat Sealer available from American International Electric Co., Whittier, Calif.
Adhesive Bonding
  A Jet Melt 3748 Q hot melt adhesive (available from 3M Co., St. Paul, Minn.) applied to the perimeter of the film, Media C positioned over the glue line, and $1.8 \times 10^5$ Pascal pressure applied to the bag construction until the hot melt adhesive cooled to ambient temperature.
Ultrasonic/Adhesive Bonding
  An ultrasonic perimeter weld line was created on the Media C bag component, after which a hot melt glue bead was applied to the welding groove. The film was subsequently firmly pressed against the glue bead to form the bag.

Bond Strength Determination
  All bond strengths were determined according to ASTM D882 standard for a 180° Peel test using a Instron Mini 55 (available from Instron Corp., Canton, Mass.) operating at a cross head speed of 0.2 cm/sec.

TABLE 10

Ultrasonic Welding

| Bag Construction | Seam Strength (kg/cm) | Comments |
|---|---|---|
| Media C/PP/SB | 1.9 | Excellent Bond |
| Media C/SB/PP | 1.6 | Excellent Bond |
| Media C/Media C | 1.3 | Good Bond |
| Media C/PP | 1.7 | Excellent Bond |
| Media C/Nylon | 0 | No Bond |
| Media C/PET | 0 | No Bond |

TABLE 11

Thermal Welding

| Bag Construction | Seam Strength (kg/cm) | Comments |
|---|---|---|
| Media C/PP/SB | 0.72 | Good Bond |
| Media C/PP | 0.76 | Good Bond |
| Media C/Nylon | 0 | No Bond |
| Media C/PET | 0 | No Bond |

TABLE 12

Adhesive Bonding

| Bag Construction | Seam Strength (kg/cm) | Comments |
| --- | --- | --- |
| Media C/PP | 1.5 | Good Bond |
| Media C/Nylon | 1.6 | Good Bond |
| Media C/PET | 1.4 | Good Bond |

The adhesively bonded bags were subjected to the cement dust loading-cycle test in which the bags were incrementally loaded with 1,000 g of cement dust and the bag subsequently impulsed by opening and closing the vacuum inlet tube at two second intervals until the bag broke or 1,000 cycles. All of the bags experienced separation failure in the filtration media at an approximately 200 g loading level.

TABLE 13

Ultrasonic/Adhesive Bonding

| Bag Construction | Seam Strength (kg/cm) | Comments |
| --- | --- | --- |
| Media C/PP | 1.6 | Good Bond |
| Media C/Nylon | 1.6 | Good Bond |
| Media C/PET | 1.5 | Good Bond |

The ultrasonic/adhesive bonded bags were subjected to the cement dust loading-cycle test described above. Pinhole leakage along the perimeter seam was observed in all the bags, presumable because of a poor seal between the filter media and the film, and small hole development was also observed in the film layer of all of he bags which was attributed to material fatigue in the film.

Based on the results of the bond strength, bonding process, and film type studies, there is a decided preference toward the use of polypropylene film, polypropylene spunbond fabric, and polypropylene microfiber filter media, all of which lend themselves to a preferred ultrasonic welding process for bonding the various vacuum bag components together into a strong, well sealed bag construction.

What is claimed is:

1. A vacuum cleaner filter bag comprising at least two sidewalls joined by seams at least one first sidewall comprising a film laminate of a heat sealable film layer and a film support layer and at least one second sidewall comprising a filter laminate comprising at least a synthetic fiber filter layer and synthetic fiber support layer where the at least one first sidewall is joined to adjacent sidewalls by a thermal seam.

2. The vacuum cleaner filter bag of claim 1 wherein said filter layer comprises a meltblown nonwoven filter layer.

3. The vacuum cleaner filter bag of claim 1 wherein said filter layer comprises a fibrillated fiber nonwoven filter layer.

4. The vacuum cleaner filter bag of claim 1 wherein said filter layer has an air permeability of from 2 to 400 m$^3$/min/m$^2$, a basis weight of from 10 to 200 g/m$^2$ and is formed at least in part of heat sealable thermoplastic fibers or fiber layers.

5. The vacuum cleaner filter bag of claim 1 wherein the filter laminate further comprises at least one inner diffusion layer formed of a nonwoven fibrous web of thermoplastic fibers having an air permeability of from 100 m$^2$/min/m$^2$ to 1000 m$^3$/min/m$^2$ the thermoplastic fibers are at least in part heat sealable fibers and the diffusion layer fibrous web has a basis weight of from 10 to 100 g/m$^2$.

6. The vacuum cleaner filter bag of claim 1 wherein said outer support layer comprises a fibrous nonwoven web having an air permeability of from 50 to 500 m$^3$/min/m$^2$ and a basis weight of from 10 to 100 g/m$^2$.

7. The vacuum cleaner filter bag of claim 1 wherein said laminate layers are bonded along peripheral seams.

8. The vacuum cleaner filter bag of claim 1 wherein the film layer comprises a outer surface of a heat sealable thermoplastic.

9. The vacuum cleaner filter bag of claim 1 wherein the film layer has a basis weight of from 30 to 200 g/m$^2$.

10. The vacuum cleaner filter bag of claim 1 wherein the film support layer is a nonwoven web having a basis weight of from 10 to 100 g/m$^2$.

11. The vacuum cleaner filter bag of claim 1 wherein the film layer comprises a polypropylene polymer or copolymer film.

12. The vacuum cleaner filter bag of claim 1 wherein the film layer and the film support layer are substantially unbonded except at the seams.

13. The vacuum cleaner filter bag of claim 1 wherein the film layer comprises a polypropylene polymer or copolymer film wherein the film layer has a basis weight of from 30 to 200 g/m$^2$ and the film support layer is a consolidated polypropylene nonwoven web having a basis weight of from 10 to 100 g/m$^2$, wherein the film layer and the film support layer are substantially unbonded except at the seams.

14. The vacuum cleaner filter bag of claim 1 wherein the filter layer is a web of electret charged fibers of a nonconductive thermoplastic resin, having a resistivity greater than $10^{14}$ ohm-cm, which nonwoven filter web has a basis weight (BW) of less than 100 grams/m$^2$, an effective fiber diameter (EFD) of less than about 5 microns and a penetration (PEN) of less than 0.03%, wherein the ratio(I);

$$BW/(EFD \cdot PEN) \qquad I$$

is greater than 100.

15. The vacuum cleaner filter bag of claim 14 wherein the filter web fibers are formed from a nonconductive polyolefin resin or blend.

16. The vacuum cleaner filter bag of claim 14 wherein the filter web basis weight is less than 60 grams/m$^2$.

17. The vacuum cleaner filter bag of claim 14 wherein the filter layer is formed of charged fibers of polypropylene, poly(4-methyl-1-pentene) or blends thereof.

18. The vacuum cleaner filter bag of claim 14 wherein the filter web ratio (I) is greater than 200.

19. The vacuum cleaner filter bag of claim 14 wherein the filter web ratio (I) is greater than 1,000.

20. The vacuum cleaner filter bag of claim 14 wherein the charged fibers of the nonwoven filter web have a charge enhancing additive.

21. The vacuum cleaner filter bag of claim 14 wherein the charged fibers of the nonwoven filter web have a charge enhancing additive at a weight percent of 0.2 to 10 percent of the charged fibers.

22. The vacuum cleaner filter bag of claim 21 wherein the charge enhancing additive comprises a hindered amine.

23. The vacuum cleaner filter bag of claim 14 wherein the filter web has a pressure drop of less than 10 mm H$_2$O.

24. The vacuum cleaner filter bag of claim 14 wherein the filter web has a pressure drop of less than 6 mm H$_2$O.

25. The vacuum cleaner filter bag of claim 14 wherein the filter web has a charge level of at least 5 μC/m$^2$.

26. The vacuum cleaner filter bag of claim 21 wherein the charge enhancing additive comprises a thermally stable organic compound or oligomer containing at least one perfluorinated moiety nor thermally stable organic triazine compounds or oligomers containing at least one nitrogen atom in addition to those of the triazine group.

* * * * *